United States Patent
Capdevielle et al.

(10) Patent No.: US 11,012,133 B2
(45) Date of Patent: May 18, 2021

(54) EFFICIENT DATA GENERATION FOR BEAM PATTERN OPTIMIZATION

(71) Applicant: NOKIA SOLUTIONS AND NETWORKS OY, Espoo (FI)

(72) Inventors: Veronique Capdevielle, Magny les Hameaux (FR); Afef Feki, Sceaux (FR); Deepak Kumar Nayak, Bangalore (IN); Claudiu Mihailescu, Versailles (FR); Nidham Ben Rached, Paris (FR); Suresh Kalyanasundaram, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/018,615

(22) Filed: Sep. 11, 2020

(65) Prior Publication Data
US 2021/0083737 A1    Mar. 18, 2021

(30) Foreign Application Priority Data

Sep. 16, 2019 (FI) .................................. 20195767

(51) Int. Cl.
*H04B 7/06* (2006.01)
*H04W 24/02* (2009.01)
(Continued)

(52) U.S. Cl.
CPC ........ *H04B 7/0617* (2013.01); *G01S 5/02523* (2020.05); *H04B 17/318* (2015.01); *H04W 24/02* (2013.01)

(58) Field of Classification Search
CPC ...... H04B 7/0617; H04B 7/318; H04W 24/02
See application file for complete search history.

(56) References Cited

U.S. PATENT DOCUMENTS 9,774,379 B2 * 9/2017 Nammi ................ H04B 7/0617
2014/0003240 A1   1/2014 Chen et al.
(Continued)

FOREIGN PATENT DOCUMENTS

| CN | 109379752 A | 2/2019 |
| EP | 3122095 A1 | 1/2017 |
| WO | 2018/160842 A1 | 9/2018 |

OTHER PUBLICATIONS

Finnish Search Report dated Jan. 20, 2020 corresponding to Finnish Patent Application No. 20195767.
(Continued)

*Primary Examiner* — Jamal Javaid
*Assistant Examiner* — Ryan C Kavleski
(74) *Attorney, Agent, or Firm* — Squire Patton Boggs (US) LLP

(57) ABSTRACT

In some embodiments, a computing system maintains, in a memory, information on one or more terminal devices, a dictionary of beams and information on a spatial grid. The computing system maps each terminal device to the spatial grid based on up-to-date results of radio measurements and calculates, for each spatial element, a load caused by the one or more terminal devices based on the mapping. The computing system evaluates, for each combination of a beam and a terminal device, a reference signal received power, RSRP, based on results of the radio measurements. The computing system calculates a first map of expected spatial distribution of traffic based on the calculated loads and beam-specific second maps of expected RSRP based on the values of the RSRP. Finally, the computing system causes performing beamforming optimization based on the first map and second maps.

20 Claims, 6 Drawing Sheets

(51) Int. Cl.
  *G01S 5/02* (2010.01)
  *H04B 17/318* (2015.01)

(56) References Cited

U.S. PATENT DOCUMENTS

| | | | |
|---|---|---|---|
| 2014/0003369 A1 | 1/2014 | Josiam et al. | |
| 2014/0087739 A1* | 3/2014 | Weaver | H04W 36/0085 455/441 |
| 2018/0019790 A1 | 1/2018 | Mondal et al. | |
| 2019/0090226 A1 | 3/2019 | Wang et al. | |
| 2019/0174346 A1 | 6/2019 | Murray et al. | |
| 2019/0319868 A1* | 10/2019 | Svennebring | H04L 41/147 |
| 2020/0127907 A1* | 4/2020 | Koo | H04W 24/04 |

OTHER PUBLICATIONS

Office Action dated Jan. 20, 2020 corresponding to Finnish Patent Application No. 20195767.
Communication of Acceptance under section 29a of Patents Decree dated May 22, 2020 corresponding to Finnish Patent Application No. 20195767.
Extended European Search Report dated Jan. 13, 2021 corresponding to European Patent Application No. 20196470.7.

* cited by examiner

EFFICIENT DATA GENERATION FOR BEAM PATTERN OPTIMIZATION

TECHNICAL FIELD

Various example embodiments relates to wireless communications.

BACKGROUND

In beamforming systems based on Grid of Beams (GoB) such as 5G systems, an accurate design of the GoB is critical in order to ensure optimized performances, in terms of coverage and/or capacity, and to maximize spectral efficiency in regions with high traffic density. The basic idea is to steer more narrow beams to regions of high traffic density and favor coarse and wider beams in the regions of lower traffic density in order to ensure coverage and to maximize the beamforming gain and received power. The real radio environment is also accounted for, by exploiting beam measurements. However, how to select the optimal beams from all available beams for a given communication scenario is a very complex problem which has been tackled, for example, using machine learning. Conventionally, methods for beam optimization require performing a large number of radio and traffic related measurements which places a heavy burden on the resources of the cell. Thus, there is a need for a solution which would enable reducing this burden by facilitating the collection of data required for beam optimization.

US 2014003240 A1 discloses solutions for supporting wireless communication paths from an antenna array with a vertical directional component. Some of said solutions reduce training feedback for increased numbers of communication paths by only reporting on a subset of reference signals provided for various vertical beam configurations. Other solutions reduce feedback with virtual measurements based on a difference between reference signal measurements.

BRIEF DESCRIPTION

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
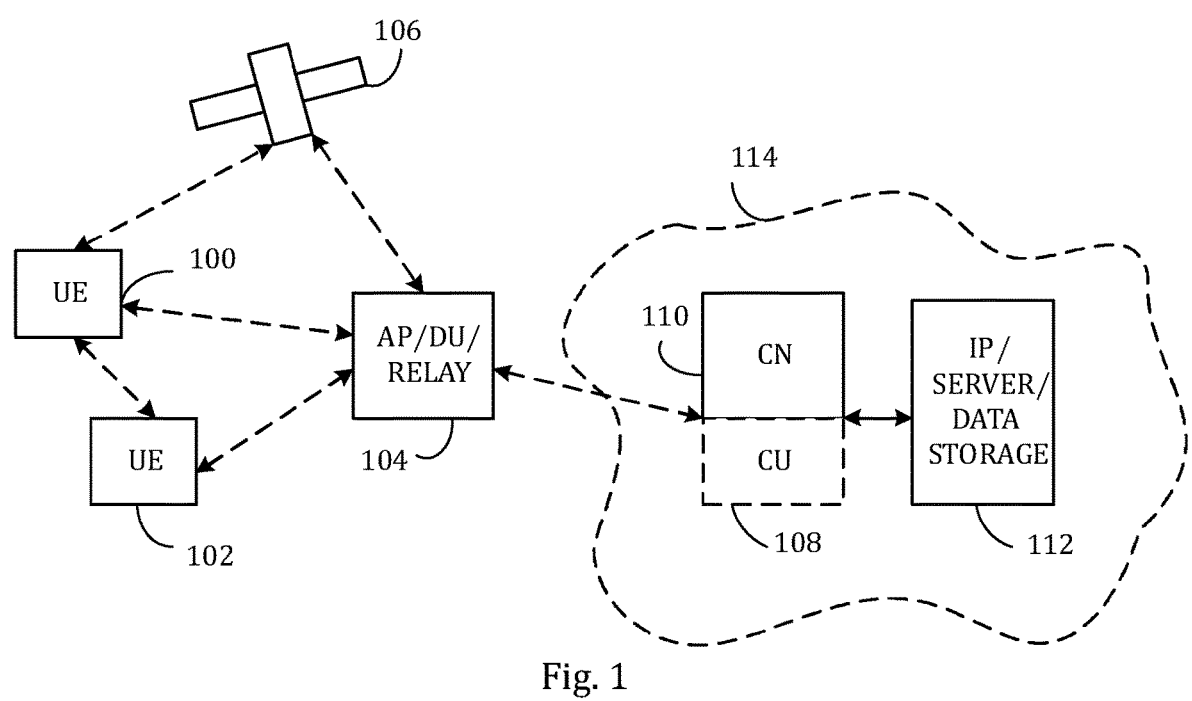
FIGS. 1, 2A and 2B illustrate exemplary wireless communication systems and apparatuses according to embodiments.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/outdoor small cell (a micro, femto, or a pico cell). The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. Each user device may comprise one or more antennas. It should be appreciated that a user device may also be a nearly exclusive uplink only device, of which an example is a camera or video camera loading images or video clips to a network. A user device may also be a device having capability to operate in (Industrial) Internet of Things ((I)IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

The exemplifying radio access network of FIG. 1 may also comprise one or more (dedicated) IoT or IIoT devices (not shown in FIG. 1) which are able to communicate with the access node 104 only via one or more of the user devices 100, 102 (i.e., they are unable to communicate directly with the access node 104).

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using (massive) multiple input-multiple output ((m)MIMO) antennas (each of which may comprise multiple antenna elements), many more base stations or nodes than the LTE (a so-called small cell concept), including macro sites operating in co-operation with smaller stations and employing a variety of radio technologies depending on service needs, use cases and/or spectrum available. A MIMO antenna (comprising a plurality of antenna elements) may be equally called a MIMO array antenna or a MIMO antenna array (comprising a plurality of antennas). 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The embodiments to be discussed below in detail may be specifically applied to communications systems with beamforming systems employing Grid of Beams (GoB), equally called Beam Pattern. Such communications system comprise, for example, 5G communications system and likely also future 5G+communications systems. In order to ensure optimized performances, e.g., in terms of coverage and/or capacity, and to maximize spectral efficiency in regions with high traffic density, an expedient design of the GoB is critical. The basic idea in the design of the GoB is to steer more narrow beams in regions of high traffic density and favor coarse and larger beams in the regions of lower traffic density in order to ensure coverage and optimal beamforming gain and received signal power across all users in the cell. The real radio environment is also accounted for, by exploiting the beam measurements.

In order to perform the beamforming according to the Grid of Beams, a subset of beams B (i.e., the so-called Grid of Beams) should be selected from a (large) set of available beams, a so-called dictionary of beams U. This selection entails solving a complex combinatorial optimization problem. This problem may be formulated as follows. Let us define the dictionary of beams as $U=\{W_n; n=1 \ldots N\}$, where $W_n$ is the nth beam or precoding vector in the dictionary of beams U and N is the total number of beams in the dictionary of beams. In general, a precoding vector is a vector having a size equal to the number of antennas in the (m)MIMO antenna to be used for beamforming. Each element of the precoding vector corresponds to a weight or weighting factor applied to a signal fed to and/or received from a particular antenna element of the (m)MIMO antenna. Moreover, a GoB configuration (i.e., a subset of U) is denoted by $B=\{B_n; n=1, \ldots, M\}$, where $B_n$ is the nth beam or precoding vector in the subset of beams, M is the total number of beams in the GoB configuration with M≤N and B⊂U. Each GoB is characterized by an average reward $\sqsupset(B)=\int_s R(s,B) \rho(s)ds$, where s is a spatial unit or element (defined as a vector) in a region of interest (ROI), R(s,B) is the (radio) gain of the beam B over the spatial element s (derivable from, e.g., reference signal received power for the beam B and the spatial element s) and p(s) is an expected traffic density on s. Typically, R(s,B) is the maximum expected reference signal received power (RSRP) ins over all beams $B_n$ from B. The problem is how to find the optimal GoB configuration B that maximizes the average reward $\sqsupset(B)$ (with some constraints in the cardinality of B).

The problem defined above may be solved in many different ways. For example, said problem may be solved using a Deep Q-Learning Network (DQN) algorithm for selecting, from the dictionary of beams, the best set of beams for optimizing a given performance indicator, such as, the traffic-density-weighted average RSRP. Alternatively, said problem may be solved, for example, based on unsupervised learning approach. In this second exemplary solution, the region of interest may be partitioned to clusters of spatial elements so that each cluster is best served by an identified beam from the dictionary of beams.

Both of the above exemplary solution approaches as well as many other possible solution approaches require radio and traffic related measurements for the cell(s) of interest. Specifically, at least the following information may be needed to be collected: RSRP or $RSRP_{n,s}$ received from each beam n belonging to the dictionary of beams U on each spatial element s in the region of interest and traffic density ρ(s) in each spatial elements. The emphasis of the embodiments to be discussed below is not so much in how to solve the aforementioned problem but more in how to acquire this information required for solving said problem in an efficient manner. The aim of the embodiments may be considered to explore all the beams of the dictionary of beams U (i.e., all the available options), without compromising the performance of the cell. However, it would be sub-optimal to iteratively transmit over one GoB (i.e., a subset of the dictionary of beams U), then perform measurements on that GoB, then change the GoB in order to collect measurements from another set of beams (another subset of U) and repeat this process for all the GoB configurations. Therefore, it would be preferable if all the beams of the dictionary U could be assessed without transmitting using all of said beams. Moreover, it would be preferable that only existing radio measurements would be employed (e.g., that separate radio measurements for each available combination of a beam and a terminal device do not have to be carried out). Finally, it would be beneficial if the approach would not rely on geo-localization of the terminal devices, that is, on transmitting additional requests for locations of terminal devices or on using beacon signals. The embodiments to be discussed below provide solutions satisfying all (or at least some) of said criteria.

Figure 2A:
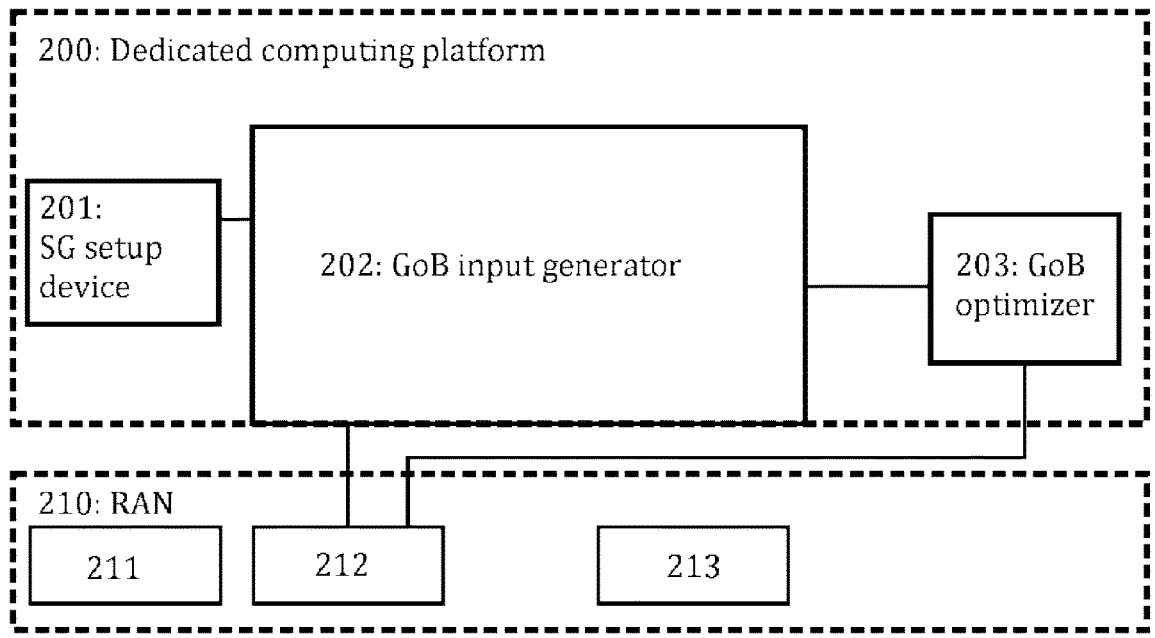
Figure 2B:
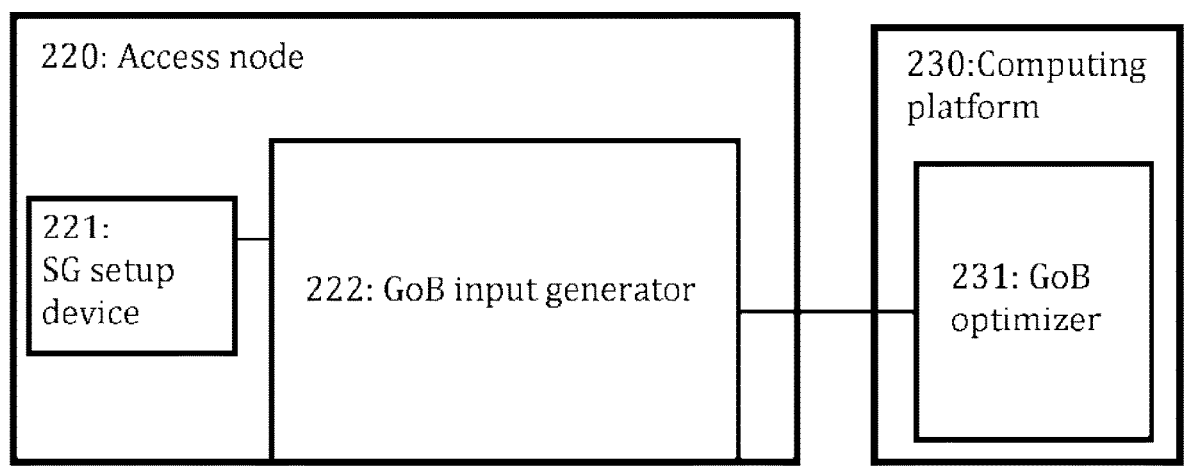

FIGS. 2A and 2B illustrates two alternative systems according to embodiments. Specifically, FIG. 2A illustrates a computing system according to embodiments implemented (in full or at least predominantly) in a dedicated computing platform while FIG. 2B illustrates a corresponding solution according to embodiments implemented in an access node. In the following properties and functionalities of the elements in FIGS. 2A and 2B are described in brief with more detailed description being provided below in relation to flow charts and signaling diagrams of FIGS. 3 to 6.

Referring to FIG. 2A, the illustrated system comprises of a dedicated computing platform 200 and a radio access network (RAN) 210. The dedicated computing platform 200 may be located, for example, fully or partly in an edge cloud. The dedicated computing platform 200 comprises a spatial grid (SG) setup device (or unit or entity) 201, a GoB input generator 202 and a GoB optimizer 203. In some embodiments, the GoB optimizer may be comprised in another (dedicated) computing platform. Each of said entities 201, 202, 203 may comprise one or more separate computing devices (e.g., servers). The radio access network 210 comprises one or more access nodes 211, 212, 213 (three shown in FIG. 2A). Each of the one or more access nodes 211, 212, 213 may correspond to the access node 104 of FIG. 1. Each of the one or more access nodes 211, 212, 213 may comprise a MIMO or massive MIMO (mMIMO) antenna array and corresponding control circuitry for forming a plurality of beams. Each of the one or more access node 211, 212, 213 may serve at least one cell.

The SG setup device 201 may be configured to at least generate or establish spatial grids to be used by the GoB input generator 202. Specifically, said spatial grids may be such that they cover at least a coverage area of a cell (or coverage areas of multiple cells) provided by an access node 212. To transfer the generated spatial grids to the GoB input generator 202, the SG setup device 201 may be connected to the GoB input generator 202 via a signaling interface.

The GoB input generator 202 may be configured to at least generate inputs required by the GoB optimizer 203 based on the spatial grid received from the SG setup device 201 and on the radio measurements (e.g., measurements of sounding reference signals and of time of arrival) received from the access node 212 and transmit said inputs to the GoB optimized 203 via a signaling interface. To enable these functionalities, the GoB input generator 202 is connected to the SG setup device 201 and to the access node 212 via signaling interfaces.

As described above, the inputs of the GoB optimizer 203 which are generated by the GoB input generator 202 may comprise at least evaluated (beam-specific) RSRP values for the spatial grid and traffic density for the spatial grid. In some embodiments, the GoB input generator may comprise separate units for different phases of the GoB input generation process. Said phases for which separate units may be provided may comprise pre-processing of data received from the SG setup device 201 (i.e., the information on a spatial grid) and the access node 212 (i.e., radio measurements relating to terminal devices), adjusting counters or loads for terminal devices located in each spatial element of the spatial grid and evaluating RSRP values for different terminal devices and beams and radio and traffic map generation.

In some embodiments, some of the functionalities described above in relation to the GoB input generator 202 may be carried out by a corresponding access node 212 instead. Specifically, some of the pre-processing of the data received from the access node (namely, calculation of channel covariance matrices based on the radio measurements or specifically on sounding reference signal measurements) may be carried out by the access node itself and the results (i.e., channel covariance matrices) may be transmitted to the GoB input generator 202.

The GoB optimizer 203 may be configured to calculate (optimal) GoB configurations based on the information provided to it by the GoB input generator 202 and apply said GoB configurations to the access node 212. To this end, the GoB optimizer 203 is connected via signaling interfaces at least to the GoB input generator 202 and to the access node 212. The GoB optimizer may carry out the optimization according to any known optimization method using as its input at least the evaluated beam-specific RSRP values for the spatial grid and traffic density for the spatial grid. (e.g., according to one of the two machine-learning-based methods mentioned above).

While in FIG. 2A only connections between the GoB input generator 202 and the GoB optimizer 203 and the access node 212 are shown for simplicity, corresponding connections may exist also between said entities 202, 203 of the dedicated computing platform 200 and any of the other access nodes 211, 213.

As mentioned above, FIG. 2B illustrates an alternative solution where the GoB input generation is performed in an access node 220, as opposed to a dedicated computing platform. The illustrated system comprises an access node 220 and a computing platform 230 external to the access node but connected to it via a signaling interface (e.g., a wireless or wired communications link). The access node comprises at least a SG setup device 221 and a GoB input generator 222 while the computing platform comprises at least a GoB optimizer 231. The access node 220 may comprise a MIMO or mMIMO antenna array for forming a plurality of beams (not shown in FIG. 2B). The access node 220 may also comprise any other conventional elements of an access node (e.g., of a gNodeB or an eNodeB), as described in relation to FIG. 1. The individual elements 221, 222, 231 may correspond, in terms of their functionalities, to respective elements 201, 202, 203 as described above though obviously, in this case no signaling interface to an access node needs to be provided in the GoB input generator 222 and the signaling interface between the GoB input generator 222 and the GoB optimizer 231 works both ways, that is, for providing inputs for the GoB optimizer 231 and for providing optimal GoB configurations for the access node 220. In some embodiments, the same GoB optimizer 231 may be shared by multiple access nodes.

In some alternative embodiments, not only the SG setup device 221 and the GoB input generator 222 but also the GoB optimizer 231 may be comprised (or hosted) in the access node 220.

Figure 3:
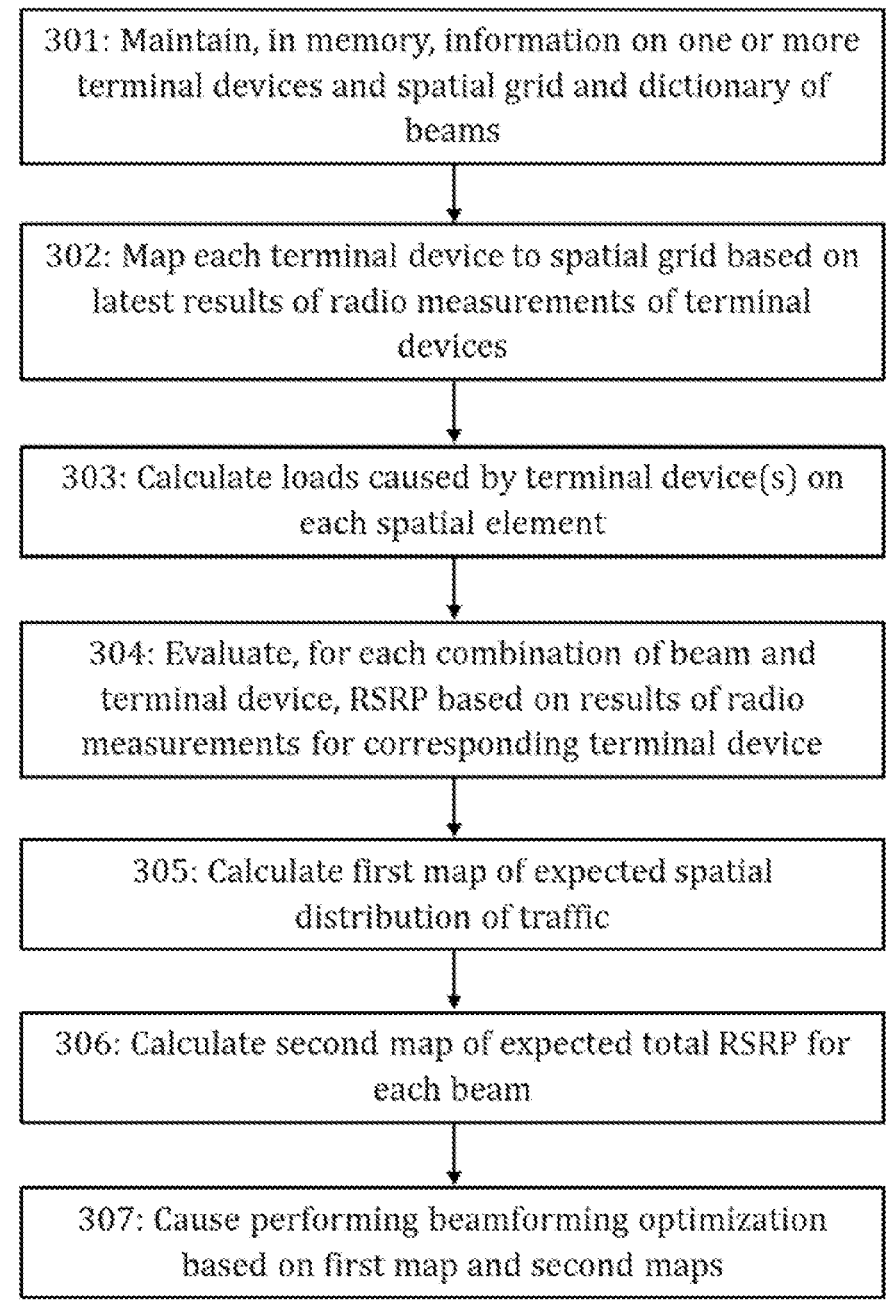
FIGS. 3 to 6 illustrate exemplary processes according to embodiments.

FIG. 3 illustrates a process according to embodiments for calculating inputs (or input data) required for (GoB) beamforming and causing beamforming optimization according to said inputs. The illustrated process of FIG. 3 may be performed by a computing device or system corresponding to a GoB input generator or a combination of a GoB input generator and a SG setup device. In general, the computing device or system may comprise one or more servers. Specifically, the process may be performed by the GoB input generator 202 of a dedicated computing platform 200 and optionally the SG setup device 201 of said dedicated computing platform 200 as depicted in FIG. 2A. In some embodiments, the computing system may also comprise the GoB optimizer 203 of FIG. 2. Alternatively, the process may be performed by the GoB input generator 222 in an access node 220 and optionally the SG setup device 221 in said access node 220 as depicted by FIG. 2B. Alternatively, the process may be performed by an access node (or specifically the access node 220 of FIG. 2B). In the following, the entity performing the process of FIG. 3 is called a computing system for brevity.

Referring to FIG. 3, the computing system initially maintains, in a memory of the computing system in block 301, information on one or more terminal devices (in most practical scenarios, a plurality of terminal devices) located in at least one cell served by an access node, a dictionary of beams covering said at least one cell and information on a spatial grid covering said at least one cell and defining a plurality of spatial elements.

The information on the one or more terminal devices may comprise, for each terminal device, at least results of a radio measurements involving a corresponding terminal device and the access node. Said results of radio measurements for each terminal device may comprise up-to-date (or latest) results (i.e., results corresponding to the current location of the terminal device and the current radio environment) and optionally also historical results (i.e., results acquired over a certain period of time for the terminal device). The information on the one or more terminal devices may not comprise a complete set of up-to-date radio measurements covering each combination of a terminal device and a beam defined in the dictionary of beams. In other words, the information on the one or more terminal devices consists of, for each terminal device, up-to-date results of radio measurements measured only using a subset of the beams defined in the dictionary of beams and optionally historical results of radio measurements measured using one or more beams defined in the dictionary of beams. Said subset may be different (or the same) for different terminal devices.

Said radio measurements may comprise radio measurements performed by a terminal device itself and/or radio measurements performed by an access node on signals transmitted by the terminal device. Specifically, said radio measurements may comprise at least measurements of a sounding reference signal (SRS) and one or more of a timing advance (TA), a time of arrival (ToA) and a pathloss.

The sounding reference signal is a reference signal transmitted by the terminal device in the uplink direction (i.e., to the access node) which may be used for estimating the uplink channel quality over a wide bandwidth. Moreover, measurements on the sounding reference signal may be used for determining the position of the terminal device in the spatial grid in angular domain (in azimuth and elevation directions), as will be described below in more detail.

Said one or more of the timing advance, a time of arrival, and a pathloss may be used at least for radial range evaluation, that is, evaluation of the radial range (i.e., distance) between the access node and the terminal device. The timing advance (TA) provides an estimate for the length of time a signal takes to reach the access node from a terminal device. The TA value is normally between 0 and 63, with each step representing an advance of one bit period (approximately 3.69 microseconds) or a change in round-trip distance (twice the propagation range) of about 1100 meters. The time of arrival corresponds also to the travel time of a radio signal from the terminal device to the access node (or vice versa). The time of arrival uses the absolute time of arrival at the access node rather than the measured time difference between the terminal device and the access node. The distance between the terminal device and the access node may be calculated from the time of arrival and time of transmission at the terminal device (having a clock synchronized with the access node).

If the computing system corresponds to a dedicated computing platform or a part thereof (e.g., located in an edge cloud) as depicted in FIG. 2A, the information on the one or more terminal devices may have been received previously from the access node (i.e., an access node 212 as shown in FIG. 2A). If the computing system corresponds to a computing system in an access node (or to an access node) as depicted in FIG. 2B, the information on the one or more terminal devices may be readily available (in a memory of the access node) for the computing system directly upon completion of the radio measurements.

The dictionary of beams comprises information on the beams which may be formed and used for transmission and reception by the access node using a MIMO or mMIMO antenna array. The dictionary of beams may comprise, for each beam, information on a precoding vector for realizing said beam, i.e., the dictionary of beams may be defined as $U=\{W_n; n=1 \ldots N\}$, as described above. The dictionary of beams may, also, comprise, for each beam, information on a pointing direction (e.g., provided as elevation and azimuthal coordinates), one or more of a beamwidth in elevation (e.g., 3 dB, 6 dB and/or 10 dB beamwidth in degrees or radians), a beamwidth in azimuth (e.g., 3 dB, 6 dB and/or 10 dB beamwidth in degrees or radians), antenna gain, antenna gain pattern, directivity and directivity pattern.

The spatial grid may specifically use a spherical coordinate system (though the use of other coordinate systems such as Cartesian coordinate system and elliptic coordinate system is also possible). For example, the spherical coordinate system (and thus also the spatial grid) may be defined through values of a radial coordinate (r), an elevation or polar coordinate ($\theta$) and an azimuthal coordinate ($\varphi$). The origin of the spatial grid may correspond to a (physical or phase) center of the associated access node. Each spatial element may be defined through, for example in the case of a spherical coordinate system, a radial coordinate range (e.g., 20 m-30 m), an elevation coordinate range (e.g., 170°-175°) and an azimuthal coordinate range (e.g., 0°-5°). Each spatial element may be defined as a vector $s=[r\ \theta\ \varphi]$. Alternatively, i and j indices (i.e., azimuthal and elevation indices) having integer values corresponding, respectively, to azimuth and elevation coordinate values (in degrees or radians) of the spatial grid may be employed for defining the spatial element in azimuth and elevation. The resolution of the spatial grid may be non-uniformly quantized. For example, the radial coordinate range covered by a single spatial element may increase (i.e., the resolution of the spatial grid may decrease) when moving away from the access node. The spatial grid may have been established or generated by a SG setup device (as described in relation to FIGS. 2A and 2B) which may or may not form a part of the computing system and subsequently transmitted to a GoB input generator (comprised in the computing system). The generating of the spatial grid is discussed in more detail in relation to further embodiments.

The computing system maps, in block 302, each of the one or more terminal devices in said at least one cell to the spatial grid based on up-to-date (or latest) results of radio measurements of the one or more terminal devices. Said up-to-date results of radio measurements of the one or more terminal devices may specifically comprise one or more (up-to-date) measurements of a sounding reference signal from the terminal device and one or more (up-to-date) measurements of one or more of the timing advance, the time of arrival and the pathloss.

The mapping in block 302 may be carried out in two steps. The computing system may, first, map each of the one or more terminal devices to a pair of azimuthal and elevation coordinates of the spatial grid based on corresponding measurements of a sounding reference signal. Second, the computing system may map each of the one or more terminal devices to a radial coordinate of the spatial grid based on a corresponding measurement of said one or more of the timing advance (TA), the time of arrival (ToA) and the pathloss. The order of these two steps may be arbitrary. As mentioned above, the distance between the access node and the terminal device (i.e., the radial coordinate) may be determined based on the timing advance or the time of arrival and the corresponding time of transmission and taking into account that radio waves propagate at light speed ($2.9979 \ast 10^8$ m/s) in air. Alternatively, the distance between the access node and the terminal device (i.e., the radial coordinate) may be determined based on the pathloss, for example, using (simplified) propagation models representative of the radio environment where the access node is deployed.

The computing system calculates, in block 303, for each spatial element of the spatial grid, a load caused by the one or more terminal devices based at least on the mapping (in block 302). The load may be defined in multiple ways. According to a simple embodiment, the load for a particular spatial element of the spatial grid corresponds to the number of terminal devices in said spatial element. In other words, the computing system adjusts, in block 303, for each terminal device in a spatial element of the spatial grid, the load (or a counter for a load) for said spatial element according to a first definition $T(s):=T(s)+1$, where $T(s)$ is the load caused by the one or more terminal for a spatial element s of the spatial grid. Initially (i.e., before any adjusting), $T(s)$ according to either definition may be equal to zero. As defined above, s is a vector defining a spatial element.

In other embodiments, the load in block 303 may be defined to depend on the traffic load (e.g., traffic volume). The computing system may adjust, in block 303, for each terminal device u, the number of terminal devices located in each spatial element of the spatial grid according to a second definition $T(s):=T(s)+<L_u>$, where $L_u$ is a traffic load attributed to a terminal device (or user) u in a spatial element s and <.> denotes a time average over a (pre-defined) sliding time window (compliant with the targeted time horizon for the traffic estimation). The traffic load $L_u$ may be specified at MAC (medium access control) level. The traffic load $L_u$ may be defined, for example, as the physical resource block (PRB) usage or the amount of traffic generated in bytes. In some embodiments, the traffic load $L_u$ may be normalized to a pre-defined value (and may thus be a unitless quantity).

The computing system evaluates, in block 304, for each combination of a beam defined in the dictionary of beams and a terminal device of the one or more terminal devices, a reference signal received power (RSRP) (or expected RSRP) based on the results of the radio measurements of the corresponding terminal device. Radio measurements of each terminal device involved in the evaluating of the RSRP in block 304 for all the beams defined in the dictionary of beams may have been performed only using a subset of the beams defined in the dictionary of beams. Specifically, the evaluation in block 304, for each beam and terminal device combination, may be based on an estimated radio channel between an access node using a corresponding beam and a corresponding terminal device calculated based on said results of the radio measurements of the corresponding terminal device. The radio channel for a certain beam and terminal device combination may be estimated based on a (non-beam-specific) channel covariance matrix calculated for said terminal device based on corresponding results of measurements on sounding reference signals and on the precoding vector for said beam defined in the dictionary of beams. In other words, the evaluating in block 304 may be performed, for each combination of a terminal device and a beam, based on the results of the radio measurements of the corresponding terminal device (or specifically SRS measurements) without having to explicitly transmit on each beam of the dictionary of beams to each terminal device. This way of estimating the values of RSRP, thus, saves both time and network resources. This evaluation is described in more detail in relation to FIGS. 4A and 4B.

The computing system calculates, in block 305, a first map of expected spatial distribution of traffic in said at least one cell based at least on the load caused by the one or more terminal devices for each spatial element (the load being defined, e.g., as described in relation to block 303). The calculation of the first map in block 305 may be also based on a total load caused by the one or more terminal devices for all the spatial elements of the spatial grid (the total load being derivable from the individual loads for each spatial element). Specifically, the calculating of the first map of expected spatial distribution of traffic $\rho(s)$ for a spatial element s may be carried out using $$\rho(s) = \frac{T(s)}{\sum_s T(s)},$$

where $\Sigma_s T(s)$ is a sum over all the spatial elements s of the spatial grid.

The first map may be equally called a first (discrete) function. The first function is specifically a function of expected spatial distribution of traffic taking as its argument radial, elevation and azimuth coordinates or some other set of coordinate defining a spatial element.

The computing system calculates, in block 306, for each beam in the dictionary of beams, a second map of expected RSRP in said at least one cell based on values of the RSRP for that beam. In other words, the computing system calculates a plurality of beam-specific second maps of expected RSRP. Specifically, the calculation in block 306 may be carried out, for each beam in the dictionary of beams, by averaging values of the RSRP for that beam separately over terminal devices in each spatial element of the spatial grid. The calculation of a second map of the expected RSRP in said at least one cell for a beam n (i.e., the calculation of $RSRP_n(s)$) may be performed according to $$RSRP_n(s) = \frac{1}{U(s)} \sum_u RSRP_{n,u}(s),$$

where U(s) is the total number of terminal devices in spatial element s and $RSRP_{n,u}(s)$ is the RSRP associated with beam n and terminal device u in spatial elements. It should be noted that, in embodiments where the load for each spatial element corresponds to the number of terminal devices in said spatial element, U(s) corresponds to T(s). In some embodiments, the $RSRP_{n,u}(s)$ may correspond specifically to RSRP (associated with beam n and terminal device u in spatial element s) which is weighted with the time-averaged traffic load for the terminal device u in spatial elements, i.e., with $<L_u>$ defined above.

Each of the second maps may be equally called a second (discrete) function. Each second function is specifically a beam-specific function of expected RSRP taking as its argument radial, elevation and azimuth coordinates or some other set of coordinates defining a spatial element.

The computing system causes, in block 307, performing beamforming optimization (i.e., beam pattern optimization) for said at least one cell based on the first map and second maps. The beamforming optimization may correspond here specifically to GoB optimization. The causing performing of the beamforming optimization may correspond to either providing the generated first map and second maps as inputs for beamforming optimization performed by another computing device (or entity or unit) or performing the beamforming optimization by the computing system itself based on the first map and the second maps. In either case, the results of the beamforming optimization (i.e., one or more beams determined to be optimal) based on the first map and the second maps may be used for beamforming in the access node. This may be achieved by transmitting information on said one or more (optimal) beams to the access node which, in response to receiving said information, forms the one or more (optimal) beams in the access node and uses them for transmission and/or reception of data packets to and/or from said at least one cell, respectively. Specifically, if the computing system consists of only a GoB input generator (as discussed in relation to FIGS. 2A and 2B), the computing system may transmit or forward said first map and second maps to a GoB optimizer (via a signaling interface) which, upon receiving said first map and second maps, performs the beamforming optimization (or specifically GoB optimization) based on said first and second maps. In some embodiments, the computing system may comprise a GoB optimizer which performs the beamforming optimization. In any of the embodiments, the beamforming optimization may be carried out using any known beamforming optimization method employing traffic density and beam-specific RSRP data, for example, any of the beamforming optimization methods outlined above.

Figure 4:
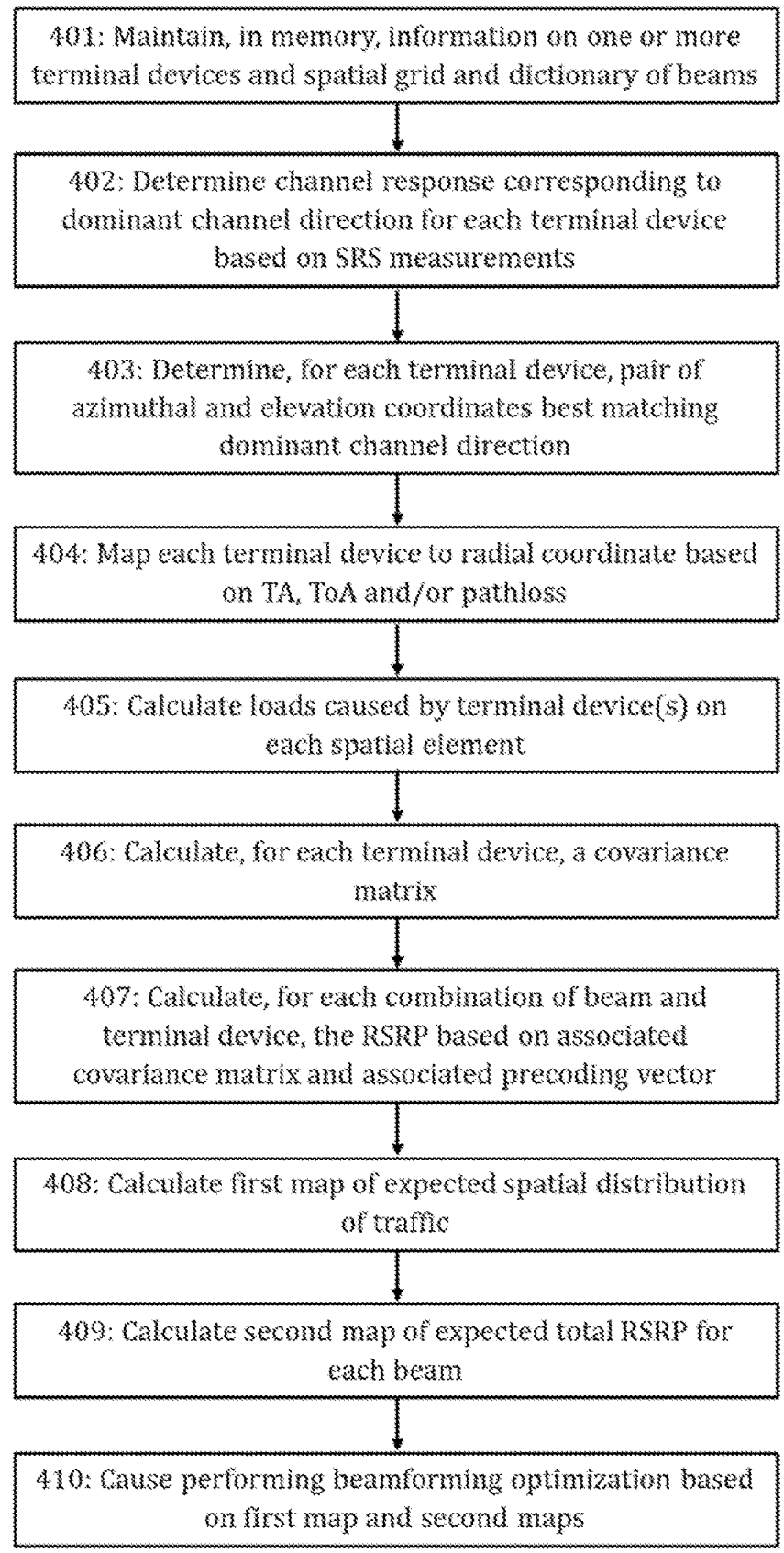

FIG. 4 illustrates a more detailed process according to embodiments for calculating inputs (or input data) required for (GoB) beamforming and causing beamforming optimization according to said inputs. The illustrated process of FIG. 4 may be performed a computing device or system corresponding to a GoB input generator or a combination of a GoB input generator and a SG setup device. Specifically, the process may be performed by the GoB input generator 202 of a dedicated computing platform 200 and optionally the SG setup device 201 of said dedicated computing platform 200 as depicted in FIG. 2A. Alternatively, the process may be performed by the GoB input generator 222 in an access node 220 and optionally the SG setup device 221 in said access node 220 as depicted by FIG. 2B. Alternatively, the process may be performed by an access node (or specifically the access node 220 of FIG. 2B). As before with FIG. 3, the entity performing the process of FIG. 4 is called simply a computing system for brevity.

Referring to FIG. 4, the computing system initially maintains, in a memory of the computing system in block 401, information on one or more terminal devices located in at least one cell served by an access node, a dictionary of beams covering said at least one cell and information on a spatial grid covering said at least one cell and defining a plurality of spatial elements. Block 401 may correspond fully to block 301 of FIG. 3.

FIG. 4 (or specifically blocks 402, 403 therein) provides a more detailed example (compared to FIG. 3) of how the mapping of each terminal device to azimuthal and elevation coordinates may be implemented. In this embodiment, it is assumed that each pair of azimuthal and elevation coordinates of the spatial grid is associated with a precoding vector for steering a beam to a pointing direction defined by said pair of azimuthal and elevation coordinates of the spatial grid. As defined above, the precoding vector may be a vector having a size equal to the number of antennas in the (m)MIMO antenna to be used for beamforming, each element of the precoding vector corresponding to a weight or weighting factor applied to a signal fed to and/or received from a particular antenna element of the (m)MIMO antenna.

To enable the mapping in angular domains, the computing system first determines, in block 402, for each terminal device of the one or more terminal devices in said at least one cell, a channel response (i.e., a channel response vector) corresponding to a dominant channel direction for said terminal device based on the measurements of the sounding reference signal. The information on the measurements of the sounding reference signal is assumed, here, to be maintained in the memory. The channel response (or channel response vector) may correspond to the dominant eigen direction of the channel. The channel response may be the dominant eigen vector of a channel covariance matrix (defined according to any of the definitions given below).

As a precoding scheme used in the SRS process and specifically the angular sampling in the precoding scheme may not necessarily match exactly the spatial grid, it may be necessary for the computing system to identify the precoding vector defined for the spatial grid which is closest to the precoding vector associated with the SRS process. Thus, the computing system determines, in block 403, for each terminal device, a pair of azimuthal and elevation coordinates of the spatial grid best matching the dominant channel direction by comparing the channel response corresponding to the dominant channel direction to precoding vectors associated with the spatial grid.

In some embodiments, the determining in block 403 may be achieved by, first, determining, for each channel response corresponding to the dominant channel direction for a terminal device, an optimal precoding vector of all precoding vectors associated with the spatial grid providing closest match with the channel response corresponding to the dominant channel direction. Specifically, the optimal precoding vector may be a precoding vector corresponding to a minimum of a norm of a difference of the channel response corresponding to the dominant channel direction for the terminal device and said (optimal) precoding vector. In other words, the optimal precoding vector is a precoding vector $v_{\hat{i},\hat{j}}$ which satisfies the equation $$\hat{v}_{\hat{i},\hat{j}} = \min_{i,j}(\|P_{SRS,u} - v_{i,j}\|^2),$$

where $P_{SRS,u}$ is the channel response corresponding to the dominant channel direction (or the dominant eigen direction of the channel) for a terminal device u (determined based on SRS measurements), i and j are indices (with ranges i=1, 2, . . . , I and j=1, 2, . . . J) corresponding, respectively, to azimuthal and elevation coordinate values, $v_{i,j}$ is a precoding vector associated with the spatial grid and $\|.\|$ denotes a norm (e.g., a Euclidean norm). Based on the optimal precoding vector, the computing system determines, also in block 404, a pair of azimuthal and elevation coordinates of the spatial grid for the terminal device based on the optimal precoding vector. Each index of i and j may map directly to an azimuthal or elevation coordinate value (e.g., i=1 corresponding to $\varphi=0°$, i=2 corresponding to $\varphi=5°$, i=3 corresponding $\varphi=10°$ and so on).

Alternatively, the indices $\hat{i}$ and $\hat{j}$ (and thus the azimuthal and elevation coordinates) corresponding to the optimal precoding vector may be calculated, in block 404, for each terminal device, directly from the channel response corresponding to the dominant channel direction $P_{SRS,u}$ according to $$(\hat{i},\hat{j}) = \operatorname{argmax}_{i,j}(\operatorname{Re}(P_{SRS,u}^{H} v_{i,j})),$$

where H is a conjugate transpose operator.

In some embodiments, the comparing (or search) in block 403 may be carried out over a reduced set of spatial elements of the spatial grid. Said reduced set of spatial elements may specifically cover only the azimuth and elevation ranges of the serving beam (as defined in the dictionary of beams). In some embodiments, the reduced set of spatial elements of the spatial grid may be limited only in one of azimuthal and elevation directions.

The $P_{SRS,u}$ corresponds only to the dominant eigen direction of the channel and thus does not consider all channel directions. In order to take into account all the channel directions, a channel matrix $H_{SRS,u}$ for each terminal device u may be calculated. The channel matrix $H_{SRS,u}$ defines the (radio) channel between an access node and a terminal device u in a MIMO system excluding any noise in the channel. The channel matrix is an $N_t \times N_r$ matrix, where $N_t$ is the number of transmit antennas at the terminal device and $N_r$ is the number of receive antennas at the access node. Notably, if the number of transmit antennas in the terminal device is one (i.e., $N_t=1$), the matrix $H_{SRS,u}$ corresponds to a 1×$N_r$ vector $H_{SRS,u}$. As mentioned above, a covariance matrix of the channel (or specifically here an instantaneous covariance matrix of the channel) may be computed as $$C_u = H_{SRS,u}^{H} H_{SRS,u}.$$

As $H_{SRS,u}$ is an instantaneous measurement from the SRS transmission, the azimuthal and elevation coordinates calculated based on it (as discussed in relation to blocks 402, 403) may be corrupted by noise. To overcome this issue, in some embodiments, a long-term covariance matrix corresponding to (long-term) statistics of the measurements of the SRS for said at least one cell (i.e., historical results of radio measurements or specifically of SRS measurements maintained in the database) may be employed in calculating, for each terminal device, the indices i and j corresponding to the optimal precoding vector. The statistics of the measurements of the SRS may correspond to a certain pre-defined period or time range. The (channel statistics-based) channel covariance matrix $C_u$ may be calculated for terminal device u using $$C_u = E(H_{SRS,u}^{H} H_{SRS,u}),$$

where E denotes an expected value of its arguments and $H_{SRS,u}$ is a random variable (channel) matrix indicating long-term statistical distribution of the channel for the terminal device u calculated based on a plurality of measurements of the sounding reference signal (i.e., based on long-term statistics of the measurements of the sounding reference signal). Regardless of whether the channel covariance matrix $C_u$ is the long-term average or the instantaneous covariance, the indices $\hat{i}$ and $\hat{j}$ corresponding to the optimal precoding vector may be calculated, for each terminal device u, based on the channel covariance matrix $C_u$ according to $$\hat{i},\hat{j} = \operatorname{argmax}_{i,j}(|v_{i,j}^{H} C_u v_{i,j}|),$$

where |.| refers to taking the absolute value of the possibly complex scalar argument. As described above, the indices $\hat{i}$ and $\hat{j}$ for a terminal device correspond to azimuthal and elevation coordinates for the terminal device.

After angular mapping in blocks 402, 403, the computing system maps, in block 404, each of the one or more terminal devices to a radial coordinate of the spatial grid based on a corresponding measurement of said one or more of the timing advance (TA), the time of arrival (ToA) and the pathloss, similar to as described in relation to FIG. 3.

Similar to as described in relation to block 303 of FIG. 3, the computing system calculates, in block 405, for each spatial element of the spatial grid, a load caused by the one or more terminal device in said at least one cell on that spatial element based at least on the mapping carried out in blocks 402, 403, 404. The load may be defined according to any of alternatives described in relation to block 303 of FIG. 3 (e.g., as the number of terminal devices in a given spatial element or as a sum of traffic load contributions for each terminal device for a given spatial element).

Above in relation to block 403, the channel covariance matrix $C_u$ of the precoding vector derived from the SRS measurements for each terminal device was described, according to some embodiments, as providing means for performing the mapping in angular domains in a manner which minimizes noise. In addition to this optional functionality, the channel covariance matrix of a terminal device may also be employed for calculating the (expected) RSRP for said terminal device. First, the terminal device may calculate, in block 406, for each terminal device u of the one or more terminal devices, a channel covariance matrix $C_u$ according to $C_u = E(H_{SRS,u}^{H} H_{SRS,u})$, similar to as described above. Obviously, if the channel covariance matrix was calculated already in connection with block 403 for performing the mapping in angular domains, said action does not have to be repeated.

Then, the computing system calculates, in block 407, for each combination of a beam n in the dictionary of beams (U={$W_n$; n=1 . . . N}) and a terminal device u of the one or more terminal devices, the RSRP as $$RSRP_{u,n} = |W_n^{H} C_u W_n|$$

wherein $W_n$ is a precoding vector of the beam n, said precoding vector of the beam n being defined in the dictionary of beams. The above equation may be written in an alternative form as $$RSRP_{u,n} = |W_n^{H} C_u W_n| = E[P_{u,n}^{H} P_{u,n}],$$

where $P_{u,n}$ is a projection of its channel estimate on the precoding vector $W_n$ of beam n in the dictionary of beams U, that is, $P_{u,n}=H_{SRS,u}W_n$, where $H_{srs,u}$ is the channel estimate from the SRS transmissions (i.e., channel matrix) for the terminal device u.

The subsequent actions described in relation to blocks 408, 409, 410 may be carried out as described in relation to blocks 305, 306, 307 of FIG. 3. In brief, the computing system calculates, in block 408, a first map of expected spatial distribution of traffic in said at least one cell based at least on the load caused by the one or more terminal devices for each spatial element (and a total load caused by the one or more terminal devices for all the spatial elements of the spatial grid) and calculates, in block 409, for each beam in the dictionary of beams, a second map of expected RSRP by averaging values of the RSRP for a beam (calculated in block 407) over the one or more terminal devices. Finally, the computing device causes, in block 410, performing beamforming (or specifically GoB) optimization for said at least one cell based on the first map and second maps (and subsequently beamforming in the access node according to results of the beamforming optimization).

Figure 5:
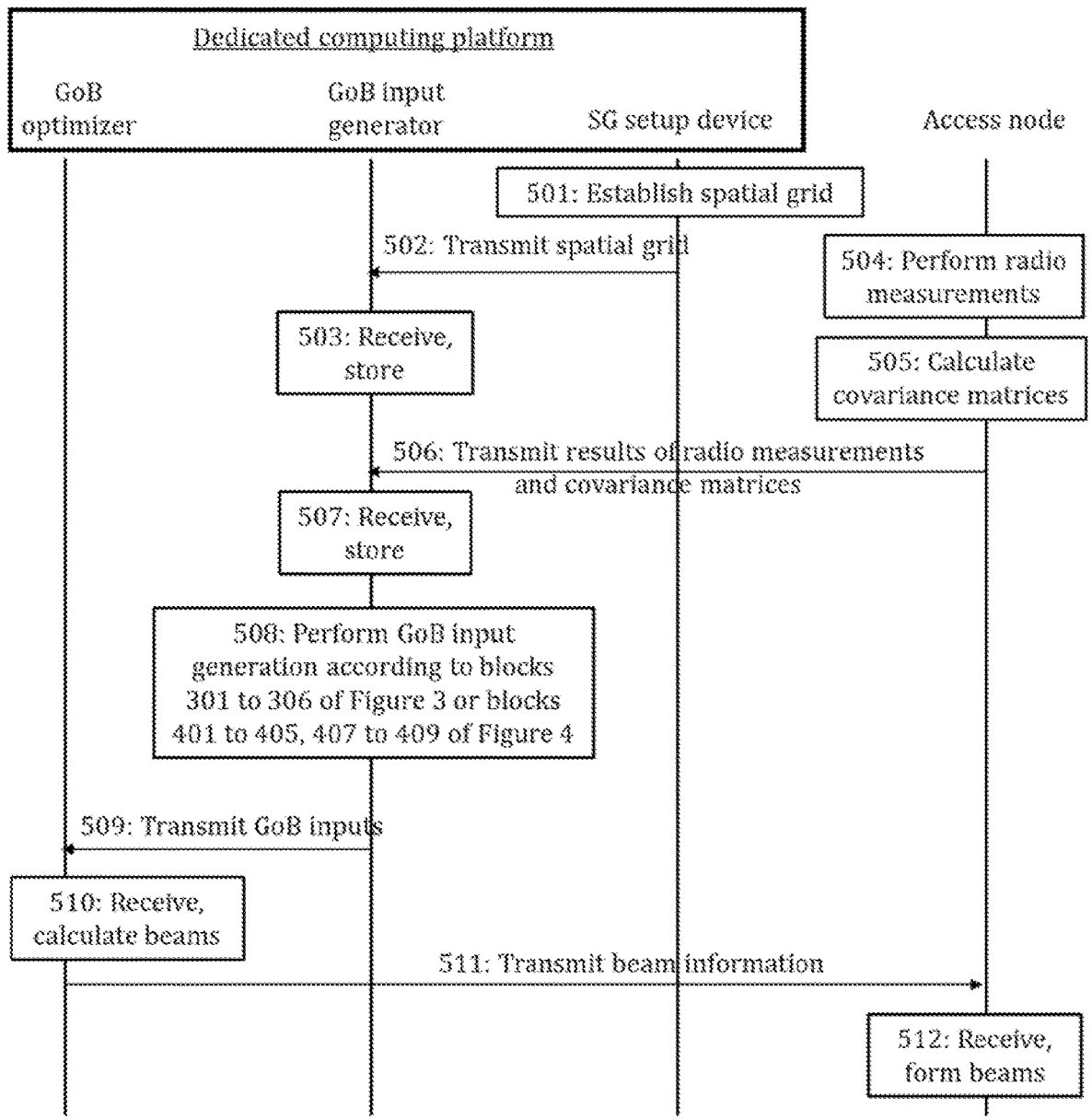

As illustrated with FIGS. 2A and 2B, the generation of the inputs (i.e., the first and second maps) for a GoB input generator (and the SG setup device) according to embodiments may be implemented in a dedicated computing platform and/or in an access node. FIG. 5 shows a signalling diagram according to embodiments illustrating an exemplary process for GoB input generation and subsequent beamforming optimization and beamforming. The system illustrated in FIG. 5 may correspond specifically to the system of FIG. 2A. Thus, the SG setup device, the GoB input generator and the GoB optimizer of FIG. 5 may be comprised in a dedicated computing platform (which may be located, e.g., in an edge cloud). Each of the SG setup device, the GoB input generator and the GoB optimizer may correspond to one or more servers. The term "computing system" used in connection with embodiments of FIGS. 3 and 4 may correspond, here, to the GoB input generator or a combination of the GoB input generator and the SG setup device or even a combination of the GoB input generator, the SG setup device and the GoB optimizer.

Referring to FIG. 5, the SG setup device (e.g., a server in the edge cloud) establishes (or generates), in block 501, a spatial grid covering at least one cell served by an access node (i.e., the access node illustrated in FIG. 5) and defining a plurality of spatial elements. The spatial grid may be defined as described in relation to block 301 of FIG. 3. For example, the spatial grid may specifically use a spherical coordinate system. To enable the establishing of the spatial grid, the SG setup device may maintain in a memory information on the access node, said information comprising, for example, information on said at least one cell served by the access node such coverage area of the said at least one cell. Further, the SG setup device may comprise, in the memory, the dictionary of beams and information on terminal devices in said at least one cell comprising at least information on measurements of time of arrival and/or timing advance for terminal devices in said at least one cell. Alternatively, any of the aforementioned information may be maintained in a database (e.g., an edge cloud database) accessible by the SG setup device and possibly also the GoB input generator.

In some embodiments, the spatial grid may be established in block 501 so as to fulfil one or more of the following constraints:

a grid spacing of the spatial grid in azimuth and elevation dimensions is smaller than (or alternatively smaller than or equal to) the smallest beamwidth of the beams in the dictionary of beams and a grid spacing of the spatial grid in a radial dimension is smaller than (or alternatively smaller than or equal to) a minimum resolvable distance (i.e., resolution in length) defined by measured time of arrival or timing advance in said at least one cell.

The grid spacing may be equally called resolution (i.e., a minimum resolvable distance). Moreover, the spatial grid may be established in block 501 so that it provides a complete representation of the traffic and radio environment in the three-dimensional space (without any holes gaps or holes).

In some embodiments, the spatial grid may be established in block 501 so that the resolution (or grid spacing) of the spatial grid in the radial dimension is not uniformly quantized.

As a part of the establishing process of block 501, the SG setup device may generate, for each element of the spatial grid in the azimuth and elevation angular plane (i.e., for each angular element defined through a pair $(\varphi,\theta)$ or (i,j)), a precoding vector $v_{i,j}$ which corresponds to a pointing direction defined by that element of the spatial grid in the azimuth and elevation angular plane. The generation of the precoding vectors $v_{i,j}$ may be based on, in addition to the spatial grid itself, the dictionary of beams maintained in the memory of the SG setup device or in a database accessible by the SG setup device. In some embodiments, the process of generating the precoding vectors may be carried out by the GoB input generator, instead.

The SG setup device transmits, in message 502, the information on the spatial grid (possible including any associated precoding vectors) to the GoB input generator via a signaling interface between the two entities. In response to receiving said information on the spatial grid in block 503, the GoB input generator stores, also in block 503, the received information to its memory. If a joint database accessible by both the SG setup device and the GoB input generator is employed, the SG setup device may merely store the information on the spatial grid to said joint database and subsequently the GoB input generator may access said information from there.

The access node performs, in block 504, radio measurements with one or more terminal devices (typically, a plurality of terminal devices) in said at least one cell. Said radio measurements may comprise, for example, measurements of one or more of SRS, ToA, TA and pathloss. Then, the access node calculates, in block 505, a channel covariance matrix $C_u$ for each terminal device u in said at least one cell based on the radio measurements (or specifically, SRS measurements) performed in block 504. The channel covariance matrix may be calculated as described in relation to FIG. 4. Specifically, the equation $C_u=E(H_{SRS,u}{}^H H_{SRS,u})$ may be used for the calculation.

While the calculation of the channel covariance matrix may be performed in the same way as described in relation to FIG. 4, the entity performing the calculation is notably different compared to the embodiment of FIG. 4. In the embodiment of FIG. 4, the computing system (consisting of the GoB input generator and optionally also the SG setup device) carries out the computation of the channel covariance matrices based on the information on radio measurements received from the access node. On the other hand, in FIG. 5 the calculation of covariance matrices is performed by the access node based on its radio measurements. In yet another embodiment (not shown in FIG. 5), the calculation of the channel covariance matrices may be performed by a dedicated server on top of the access node and connected to it via a signaling interface based on the results of radio measurements derived in block 504 and provided by the access node to the dedicated server.

After having calculated the channel covariance matrices in block 505, the access node transmits, in message 506, both the information on results of the radio measurements involving the one or more terminal devices in said at least one cell and the channel covariance matrices for the one or more terminal devices calculated based on said results of the radio measurements to the edge cloud (specifically, at least to the GoB input generator) via a signaling interface. In some embodiments, the information on results of the radio measurements and the channel covariance matrices may be transmitted in different messages and possibly at different times. In response to receiving the information on results of the radio measurements, the GoB input generator may store the received information to the memory of the GoB input generator.

The performing of radio measurements in block 504, corresponding calculation of covariance matrices in block 505 and their reporting to the dedicated computing platform (i.e., at least to the GoB input generator) in message 506 may be repeated periodically. Actions described in relation to elements 501 to 503 and elements 504 to 507 may be carried out in any order (e.g., blocks 504 to 507 before blocks 501 to 503) or in parallel with each other. In some embodiments, the information on results of radio measurements (transmitted in message 506) may be transmitted also to the SG setup device.

In FIG. 5, the GoB input generator may, in addition to the information stored to the memory in blocks 503, 507, maintain, in the memory, further information on one or more terminal devices located in said at least one cell served by the access node (e.g., results of earlier radio measurements) and a dictionary of beams covering said at least one cell. Based on the information stored to its memory, the GoB input generator may generate, in block 508, inputs for the GoB optimizer (i.e., a first map of expected spatial distribution of traffic in said at least one cell and beam-specific second maps of expected RSRP) as described in relation to any of the above embodiments. Specifically, the GoB input generation may be carried out by performing blocks 301 to 306 of FIG. 3 or blocks 401 to 405 and block 407 to 409 of FIG. 4 or any feasible combination of said blocks of FIGS. 3 and 4.

After the first map of expected spatial distribution of traffic in said at least one cell and beam-specific second maps of expected RSRP have been calculated by the GoB input generator in block 508, the GoB input generator transmits, in message 509, the first map and the second maps (i.e., the inputs) to the GoB optimizer via a signaling interface between the GoB input generator and the GoB optimizer.

In response to receiving the first map and the second maps in block 510, the GoB optimizer performs beamforming optimization by calculating, in block 510, one or more optimal beams of the beams defined in the dictionary of beams for handling the traffic in said at least one cell based on the first map and the second maps. This calculation may be performed according to any known beamforming scheme. Consequently, the GoB optimizer transmits, in message 511, the information on the one or more optimal beams to the access node via a signalling interface between the GoB optimizer and the access node. Upon receiving the information on the one or more optimal beams in block 512, the access node forms, in block 512, the one or more optimal beams using its (m)MIMO antenna and associated control circuitry and employs said optimal beams for handling the traffic in said at least one cell served by the access node.

Figure 6:
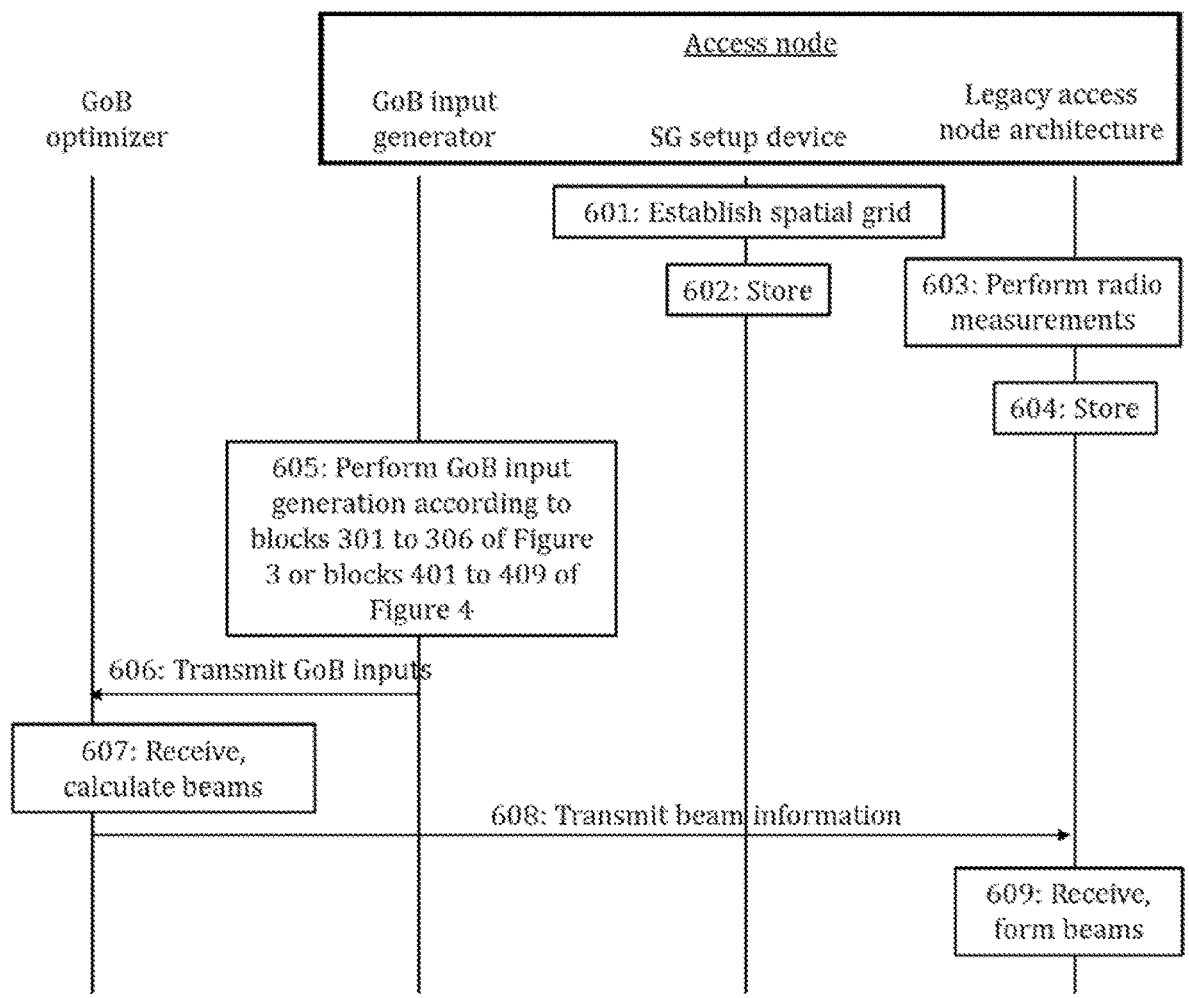

FIG. 6 shows another signalling diagram according to embodiments illustrating an exemplary process for GoB input generation and subsequent beamforming. The system illustrated in FIG. 6 may correspond specifically to the system of FIG. 2B. Thus, the SG setup device and the GoB input generator of FIG. 6 may be comprised in an access node and the GoB optimizer of FIG. 6 may be comprised in an external computing platform. The term "computing system" used in connection with embodiments of FIGS. 3 and 4 may correspond, also here, to the GoB input generator or a combination of the GoB input generator and the SG setup device. The term "legacy access node architecture" is used in FIG. 6 merely to indicate access node functionalities not performed by the GoB input generator and the SG setup device of the access node but by conventional access node circuitry or units. No limitation of the access node to an access node of a particular generation is intended with this term. The legacy access node architecture may correspond, for example, to the access node 104 of FIG. 1.

The actions carried out in FIG. 6 correspond for the most part to the actions described in relation to FIG. 5. The difference between the illustrated exemplary embodiments lies mostly in which entity carries out the processes and how the signalling between different entities is arranged.

Referring to FIG. 6, the establishing of the spatial grid in block 601 may correspond to establishing as described in relation to block 501. The only difference may be that in FIG. 5 the SG setup device is located in the access node and thus it may have direct access to any information on results of radio measurements (e.g., SRS measurements) carried out by the access node. As described above, some of said results of radio measurements (namely, results of SRS measurements) may be employed also in establishing the spatial grid. After establishing the spatial grid, the SG setup device stores, in block 602, information on the spatial grid (optionally comprising also associated precoding vectors) to a memory of the access node. Said memory of the access node may be accessible not only by the SG setup device but also by the GoB input generator (and other subunits of the access node).

The performing of the radio measurements in block 603 may also be carried out as described in relation to FIG. 5 (namely, block 504 of FIG. 5). The results of the radio measurements are stored, in block 604, to the memory of the access node. In some embodiments, the channel covariance matrices may also be calculated by the access node as described in block 505 and subsequently stored to the memory of the access node (not shown in FIG. 6). Alternatively, said calculation (and possibly storing) of covariance matrices may be included in block 605.

The GoB input generation performed by the GoB input generator of the access node in block 605 may be carried out mostly as described in relation to block 508 of FIG. 5 (with the exception of the possible inclusion of covariance matrix calculation in block 605 as mentioned above). Also here, the GoB input generator may employ in the calculations of block 605 information stored to the memory of the access node (i.e., a memory accessible by all the units of the access node). Moreover, actions pertaining to elements 606 to 609 may also correspond to actions pertaining to blocks 509 to 512, respectively. The only difference is that different signalling interfaces may be used for communicating between the GoB input generator of the access node, GoB optimizer of the external computing platform and the "legacy" access node architecture compared to communication between the GoB input generator of the dedicated computing platform, the GoB optimizer of the dedicated computing platform and the access node.

The blocks, related functions, and information exchanges described above by means of FIGS. 3 to 6 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 7:
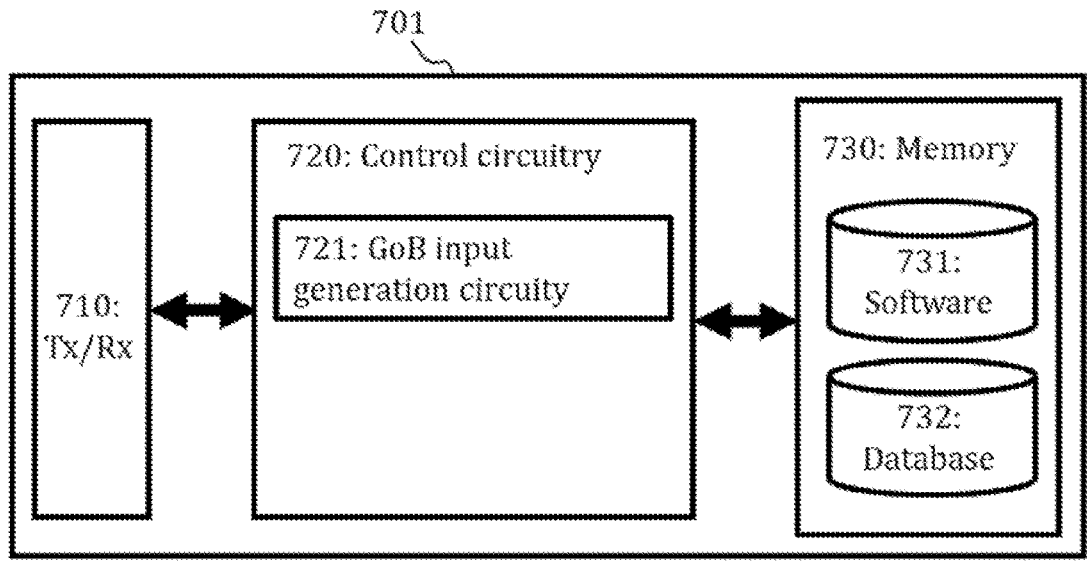
FIG. 7 illustrates an apparatus according to embodiments.

FIG. 7 provides an apparatus 701 (i.e., a computing system, a computing apparatus or a computing device) at least for generation of input data (i.e., first and second maps as defined above) to be used for beamforming optimization. Specifically, FIG. 7 may illustrate a computing device corresponding to a GoB input generator (e.g., a GoB input generator 202 of FIG. 2A or a GoB input generator 222 of FIG. 2B), as described above. Alternatively, FIG. 7 may illustrate a computing device corresponding a combination of said GoB input generator and one or more of a SG setup device (e.g., a SG setup device 201 of FIG. 2A or a SG setup device 221 of FIG. 2B) and the GoB optimizer (e.g., a GoB optimizer 203 of FIG. 2A or a GoB optimizer 231 of FIG. 2B), as defined above. The apparatus 701 may be a dedicated computing platform or a part of a dedicated computing platform. Said dedicated computing platform may be located (at least in part) in an edge cloud. Alternatively, the apparatus 701 may be an access node or a part or a sub-unit of an access node.

The apparatus 701 may comprise one or more communication control circuitry 720, such as at least one processor, and at least one memory 730, including one or more algorithms 731, such as a computer program code (software) wherein the at least one memory and the computer program code (software) are configured, with the at least one processor, to cause the apparatus to carry out any one of the exemplified functionalities of the apparatus (i.e., of the computing system) described above, respectively. Said at least one memory 730 may also comprise at least one database 732.

Referring to FIG. 7, the one or more communication control circuitry 720 comprise at least GoB input generation circuitry 721 which is configured to generate the inputs required for performing beamforming optimization (that is, to calculate a first map of expected spatial distribution of traffic in at least one cell and beam-specific second maps of expected RSRP) and cause beamforming optimization using said inputs. To this end, the GoB input generation circuitry 721 is configured to carry out at least some of the functionalities described above by means of any of FIGS. 3, 4, blocks 503, 507, 508, 509 of FIG. 5 and blocks 605, 606 of FIG. 6 using one or more individual circuitries.

In some embodiments, the one or more communication control circuitry 720 may further comprise SG setup circuitry and/or GoB input circuitry for performing, respectively, actions described in relation to a SG setup device and/or a GoB optimizer above (not shown in FIG. 7). For example, the SG setup circuitry may be configured to carry out at least some of the functionalities described above by means of any of blocks 501, 502 of FIG. 5 and blocks 601, 602 of FIG. 6 using one or more individual circuitries. For example, the GoB optimizer circuitry may be configured to carry out at least some of the functionalities described above by means of any of blocks 510, 511 of FIG. 5 and blocks 607, 608 of FIG. 6 using one or more individual circuitries.

Referring to FIG. 7, the memory 730 may be implemented using any suitable data storage technology, such as semiconductor based memory devices, flash memory, magnetic memory devices and systems, optical memory devices and systems, fixed memory and removable memory.

Referring to FIG. 7, the apparatus 701 may further comprise different interfaces 710 such as one or more signaling interfaces (TX/RX) comprising hardware and/or software for realizing communication connectivity according to one or more communication protocols. Specifically, the one or more signaling interfaces 710 may comprise, for example, interfaces providing a connection to one or more access nodes (or sub-units therein), to one or more (external) computing devices such as (dedicated) computing platforms, to one or more (secondary) servers and/or to one or more elements or devices in an edge cloud. The one or more signaling interfaces 710 may provide the apparatus with communication capabilities to communicate (possibly via one or more computing devices such as an access node) in a cellular or wireless communication system, to access the Internet and a core network of a wireless communications network and/or to enable communication between user devices (terminal devices) and different network nodes or elements, for example. The one or more signaling interfaces 710 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 3 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 6 or operations thereof.

Embodiments as described may also be carried out in the form of a computer process defined by a computer program or portions thereof. Embodiments of the methods described in connection with FIGS. 3 to 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A computing system, comprising:
   at least one processor; and
   at least one memory including computer program code, the at least one memory and computer program code being configured, with the at least one processor, to cause the computing system to perform:
   maintaining, in the at least one memory, information on one or more terminal devices located in at least one cell served by an access node, a dictionary of beams defining beams covering said at least one cell and information on a spatial grid covering said at least one cell and defining a plurality of spatial elements, wherein the information on the one or more terminal devices comprises, for each terminal device, at least results of radio measurements involving a corresponding terminal device and the access node using one or more beams defined in the dictionary of beams;
   mapping each of the one or more terminal devices to the spatial grid based on up-to-date results of radio measurements of the one or more terminal devices;
   calculating, for each spatial element of the spatial grid, a load caused by the one or more terminal devices based at least on the mapping;
   evaluating, for each combination of a beam defined in the dictionary of beams and a terminal device of the one or more terminal devices, a reference signal received power, RSRP, based on results of the radio measurements for the corresponding terminal device, wherein radio measurements of each terminal device involved in the evaluating of the RSRP for the beams defined in the dictionary of beams were performed only using a subset of said beams;
   calculating a first map of expected spatial distribution of traffic in said at least one cell based at least on the load caused by the one or more terminal devices for each spatial element;
   calculating, for each beam in the dictionary of beams, a second map of expected RSRP in said at least one cell based on the values of the RSRP for a corresponding beam; and
   causing performing Grid of Beams, GoB, beamforming optimization for said at least one cell based on the first map and second maps for forming an optimal set of one or more beams of the beams defined in the dictionary of beams for handling the traffic in said at least one cell.

2. The computing system according to claim 1, wherein the results of the beamforming optimization based on the first map and the second maps are used for beamforming in the access node.

3. The computing system according to claim 1, wherein the at least one memory and computer program code are further configured to cause the computing system to perform the calculating of each second map of expected RSRP by averaging values of the RSRP for a corresponding beam over the one or more terminal devices in each spatial element of the spatial grid.

4. The computing system according to claim 1, wherein the information on the one or more terminal devices consists of, for each terminal device, up-to-date results of radio measurements measured only using a subset of the beams defined in the dictionary of beams and optionally historical results of radio measurements measured using one or more beams defined in the dictionary of beams.

5. The computing system according to claim 1, wherein the spatial grid uses a spherical coordinate system.

6. The computing system according to claim 5, wherein at least one memory and computer program code are further configured to cause the computing system to perform:
   one of
   establishing the spatial grid and
   receiving the information on the spatial grid from a computing device for establishing the spatial grid via a signaling interface; and
   storing the information on the spatial grid to the memory.

7. The computing system according to claim 6, wherein the radio measurements involving the one or more terminal devices comprise at least measurements of a sounding reference signal, SRS, and one or more of a timing advance, TA, a time of arrival, ToA, and a pathloss.

8. The computing system according to claim 7, wherein the mapping each of the one or more terminal devices to the spatial grid comprises:
   mapping each of the one or more terminal devices to a pair of azimuthal and elevation coordinates of the spatial grid based on corresponding measurements of the SRS; and mapping each of the one or more terminal devices to a radial coordinate of the spatial grid based on a corresponding measurement of said one or more of the TA, the ToA and the pathloss.

9. The computing system according to claim 8, wherein each pair of azimuthal and elevation coordinates of the spatial grid is associated with a precoding vector corresponding to a direction defined by said pair of azimuthal and elevation coordinates of the spatial grid, the mapping of each of the one or more terminal devices to the pair of azimuthal and elevation coordinates comprises performing, for each terminal device of the one or more terminal devices:
  determining a channel response corresponding to a dominant channel direction for a terminal device based on the measurements of the sounding reference signal; and
  determining, for the terminal device, the pair of azimuthal and elevation coordinates of the spatial grid best matching the dominant channel direction by comparing the channel response corresponding to the dominant channel direction to precoding vectors associated with the spatial grid.

10. The computing system according to claim 9, wherein the at least one memory and computer program code are further configured to limit the comparing of the channel response corresponding to the dominant channel direction to precoding vectors covering azimuth and elevation ranges of a serving beam as defined in the dictionary of beams.

11. The computing system according to claim 9, wherein the determining of the pair of azimuthal and elevation coordinates best matching the dominant channel direction for each terminal device by comparing the channel response corresponding to the dominant channel direction to precoding vectors associated with the spatial grid comprises:
  calculating, for each terminal device, optimal azimuthal and elevation indices $\hat{i}$ and $\hat{j}$ corresponding to the optimal precoding vector according to $(\hat{i},\hat{j})=\mathrm{argmax}_{i,j}(\mathrm{Re}(P_{SRS,u}^H v_{i,j}))$, wherein $P_{SRS,u}$ is the channel response corresponding to the dominant channel direction for a terminal device u, H is a conjugate transpose operator and $v_{i,j}$ is a precoding vector associated with the spatial grid with azimuthal index i and elevation index j, each index i corresponding to an azimuthal angle of the spatial grid and each index j corresponding to an elevation angle of the spatial grid.

12. The computing system according to claim 9, wherein the determining of the pair of azimuthal and elevation coordinates best matching the dominant channel direction for each terminal device by comparing the channel response corresponding to the dominant channel direction to precoding vectors associated with the spatial grid comprises:
  calculating, for each terminal device u, a channel covariance matrix $C_u$ based on statistics of measurements of the SRS over a pre-defined period maintained in the memory or
  receiving, for each terminal device u, a channel covariance matrix $C_u$ from the access node via a signaling interface between the computing system and the access node; and
  calculating, for each terminal device, optimal azimuthal and elevation indices $\hat{i}$ and $\hat{j}$ corresponding to the optimal precoding vector according to $\hat{i},\hat{j}=\mathrm{argmax}_{i,j}(|v_{i,j}^H C_u v_{i,j}|)$, wherein H is a conjugate transpose operator and $V_{i,j}$ is a precoding vector associated with the spatial grid with an azimuthal index i and an elevation index j, each index i corresponding to an azimuthal angle of the spatial grid and each index j corresponding to an elevation angle of the spatial grid.

13. The computing system according to claim 7, wherein the evaluating of the RSRP comprises:
  calculating, for each terminal device u of the one or more terminal devices, a channel covariance matrix $C_u$ based on statistics of measurements of the SRS over a pre-defined period maintained in the memory or
  receiving, for each terminal device u of the one or more terminal devices, a channel covariance matrix $C_u$ from the access node via a signaling interface between the computing system and the access node; and
  calculating, for each combination of a beam n in the dictionary of beams and a terminal device u of the one or more terminal devices, the RSRP as $\mathrm{RSRP}_{n,u}=|W_n^H C_u W_n|$, wherein H is a conjugate transpose operator and $W_n$ is a precoding vector of the beam n, said precoding vector of the beam n being defined in the dictionary of beams.

14. The computing system according to claim 1, wherein the calculating of the load for each spatial element comprises:
  adjusting, for each terminal device in a spatial element s of the spatial grid, the load for said spatial element according to one of a first definition $T(s):=T(s)+1$ and a second definition $T(s):=T(s)+<L_u>$, wherein T(s) is the load caused by the one or more terminal for the spatial element s of the spatial grid, $L_u$ is a traffic load attributed to a terminal device u in a spatial element s and <.> denotes a time average over a sliding time window.

15. The computing system according to claim 1, wherein the calculating of the first map of expected spatial distribution of traffic in said at least one cell comprises:
  calculating the first map of expected spatial distribution of traffic ρ(s) as $$\rho(s) = \frac{T(s)}{\sum_s T(s)},$$

wherein T(s) is the load caused by the one or more terminal for a spatial element s of the spatial grid and $\Sigma_s T(s)$ is a sum over all the spatial elements s of the spatial grid.

16. The computing system according to claim 1, wherein the computing system further comprise one or more servers of a dedicated computing platform associated with a radio access network of the access node, the causing performing of the beamforming optimization for said at least one cell based on the first map and the second maps comprising:
  performing beamforming optimization for said at least one cell based on the first map and the second maps using said one or more servers in an edge cloud to determine one or more optimal beams of the beams defined in the dictionary of beams and transmitting information on the one or more optimal beams to the access node for forming the one or more optimal beams; or
  transmitting the first map and the second maps to a secondary server in the dedicated computing platform or in another computing platform via a signaling interface between the one or more servers and the secondary server, wherein the secondary server is configured to perform beamforming optimization based on the first map and the second maps to determine one or more optimal beams of the beams defined in the dictionary of beams and to transmit information on the one or more optimal beams to the access node for forming the one or more optimal beams.

17. The computing system according to claim 16, wherein the dedicated computing platform is located, partially or fully, in the edge cloud for the radio access network of the access node.

18. The computing system according to claim 1, wherein the computing system is comprised in the access node, the causing performing of the beamforming optimization for said at least one cell based on the first map and the second maps comprising:
transmitting the first map and the second maps to a computing platform external to the access node via a signaling interface between the access node and the computing platform, wherein the computing platform is configured to perform beamforming optimization based on the first map and the second maps to determine one or more optimal beams of the beams defined in the dictionary of beams and to transmit information on the one or more optimal beams to the access node for forming the one or more optimal beams.

19. A method, comprising:
maintaining, in a memory, information on one or more terminal devices located in at least one cell served by an access node, a dictionary of beams defining beams covering said at least one cell and information on a spatial grid covering said at least one cell and defining a plurality of spatial elements, wherein the information on the one or more terminal devices comprises, for each terminal device, at least results of radio measurements involving a corresponding terminal device and the access node using one or more beams defined in the dictionary of beams;
mapping each of the one or more terminal devices to the spatial grid based on up-to-date results of radio measurements of the one or more terminal devices;
calculating, for each spatial element of the spatial grid, a load caused by the one or more terminal devices based at least on the mapping;
evaluating, for each combination of a beam defined in the dictionary of beams and a terminal device of the one or more terminal devices, a reference signal received power, RSRP, based on results of the radio measurements for the corresponding terminal device, wherein radio measurements of each terminal device involved in the evaluating of the RSRP for the beams defined in the dictionary of beams were performed only using a subset of said beams;
calculating a first map of expected spatial distribution of traffic in said at least one cell based at least on the load caused by the one or more terminal devices for each spatial element;
calculating, for each beam in the dictionary of beams, a second map of expected RSRP in said at least one cell based on the values of the RSRP for a corresponding beam; and
causing performing Grid of Beams, GoB, beamforming optimization for said at least one cell based on the first map and second maps for forming an optimal set of one or more beams of the beams defined in the dictionary of beams for handling the traffic in said at least one cell.

20. A non-transitory computer readable medium comprising program instructions stored thereon for performing at least the following:
maintaining, in a memory, information on one or more terminal devices located in at least one cell served by an access node, a dictionary of beams defining beams covering said at least one cell and information on a spatial grid covering said at least one cell and defining a plurality of spatial elements, wherein the information on the one or more terminal devices comprises, for each terminal device, at least results of radio measurements involving a corresponding terminal device and the access node using one or more beams defined in the dictionary of beams;
mapping each of one or more terminal devices in at least one cell served by an access node to a spatial grid based on up-to-date results of radio measurements of the one or more terminal devices, wherein the spatial grid covers said at least one cell and defines a plurality of spatial elements;
calculating, for each spatial element of the spatial grid, a load caused by the one or more terminal devices based at least on the mapping;
evaluating, for each combination of a beam defined in a dictionary of beams and a terminal device of the one or more terminal devices, a reference signal received power, RSRP, based on results of the radio measurements for the corresponding terminal device, wherein beams of the dictionary of beams cover said at least one cell and radio measurements of each terminal device involved in the evaluating of the RSRP for the beams defined in the dictionary of beams were performed only using a subset of said beams;
calculating a first map of expected spatial distribution of traffic in said at least one cell based at least on the load caused by the one or more terminal devices for each spatial element;
calculating, for each beam in the dictionary of beams, a second map of expected RSRP in said at least one cell based on the values of the RSRP for a corresponding beam; and
causing performing Grid of Beams, GoB, beamforming optimization for said at least one cell based on the first map and second maps for forming an optimal set of one or more beams of the beams defined in the dictionary of beams for handling the traffic in said at least one cell.

* * * * *